United States Patent Office 2,838,575
Patented June 10, 1958

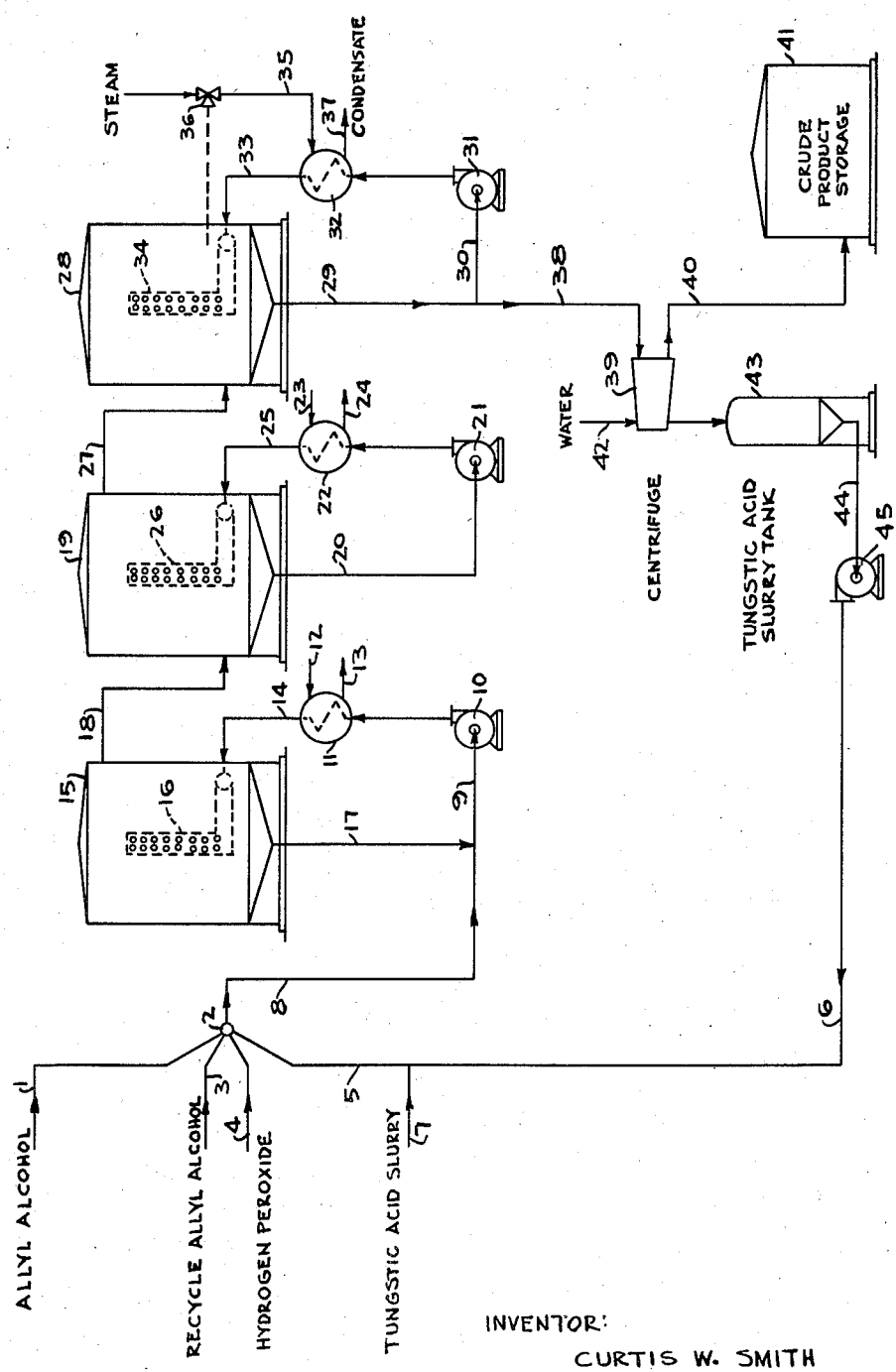

2,838,575

PRODUCTION OF GLYCERINE BY HYDROXYLATION OF ALLYL ALCOHOL

Curtis W. Smith, Berkeley, Calif., assignor to Shell Development Company, New York, N. Y., a corporation of Delaware Application May 3, 1956, Serial No. 582,573

6 Claims. (Cl. 260—635)

This invention relates to the production of polyhydroxy organic compounds by reacting the corresponding olefinic compounds with hydrogen peroxide. It deals with an improved method for thus hydroxylating allyl alcohol whereby more efficient conversion to glycerine can be achieved.

It is known that a wide variety of organic compounds which contain at least one olefinic double bond, i. e. a double bond between two carbon atoms of aliphatic character, can be reacted with hydrogen peroxide to form polyhydroxy compounds by addition of two hydroxy groups at the double bond. In the case of unsaturated fatty acids and their esters, the reaction is easily carried out without danger of excessive side reactions, particularly oxidation, but with oxidation-susceptible olefinic compounds which do not contain a

group, the reaction is rather slow and difficult to carry out efficiently without formation of undesirable amounts of by-products. By the use of suitable catalysts, especially metal oxides which form unstable peracids, the reaction can be considerably improved. Bergsteinsson patent, U. S. 2,373,942, discloses and claims the use in this reaction of tungstic acid catalysts which are especially advantageous hydroxylation promoters. Even with the best of catalysts, however, the reaction is still undesirably slow and rather extensive side reactions occur in the case of the hydroxylation of allyl alcohol to glycerine. It has been proposed to shorten the reaction time by taking advantage of the well-known fact the hydroxylations proceed faster at higher temperatures. British Patent 654,764, for instance, recommends temperatures between 70° C. and 100° C. for this purpose when using tungsten or molybdenum oxide as catalyst. By this method, shorter reaction times can be achieved but only at a sacrifice in the yield of desirable products obtainable from a given amount of starting materials, particularly hydrogen peroxide.

An important object of the present invention is to overcome the foregoing deficiencies of prior methods of hydroxylating allyl alcohol. A specific object is to provide a method whereby allyl alcohol can be hydroxylated in aqueous solution with hydrogen peroxide at greater throughput rates, for an apparatus of a given size, than has heretofore been possible and without loss of yield, particularly yield based upon hydrogen peroxide. A further object is to increase the efficiency and economy of hydroxylation of allyl alcohol on a commercial scale. Still other objects and advantages of the invention will be apparent from the following description of the new process.

It has been found that, by carrying out the hydroxylation of allyl alcohol by reaction with hydrogen peroxide, using as catalyst a tungstic acid or salt thereof, which catalysts will, for the sake of brevity, be referred to generically hereinafter as tungstic catalysts, first at a temperature within the range of 40° C. to 60° C. until the hydrogen peroxide content of the reaction mixture is reduced to not more than about 5% of the amount originally present, and then heating the reaction mixture at a substantially higher temperature of at least 70° C. and preferably within the range of about 70° C. to about 170° C., the overall period of reaction can be materially shortened while side reactions leading to loss of either reactant are minimized or substantially suppressed. The particular combination of temperatures within these two different ranges which it will be most desirable to use in any given case will depend upon the tungstic catalyst which is chosen for the reaction. It is very important, in any case, to maintain the reaction mixture within the range of 40° C. to 60° C. until substantially complete disappearance of free hydrogen peroxide has taken place before subjecting the mixture to the second step of reaction at a higher temperature. Apparently, in the first stage of reaction the hydrogen peroxide, unlike some other hydroxylating agents, combines with the catalyst and/or forms intermediates with the olefinic compound or is otherwise consumed before formation of the desired polyhydroxy product is complete. A temperature within the range of 40° C. to 60° C. is necessary to promote the desired preliminary reaction. Higher temperatures, on the other hand, favor oxidation by free hydrogen peroxide or its loss in other side reactions when allyl alcohol is being hydroxylated. These side reactions are suppressed, however, in the process of the present invention where such temperatures are only used in the second step in the substantial absence of free hydrogen peroxide. Under these conditions a material shortening of the reaction time is achieved without sacrific in conversion or yield. As a result, the investment required for a given plant production rate of glycerine is substantially reduced and the overall cost of the final product is less, not only because of the lower capital costs but also due to the simplified recovery system which is made feasible due to the higher purity of the glycerine obtained in the absence of side reactions.

The new process is carried out in an aqueous medium using a molar excess of allyl alcohol to hydrogen peroxide and preferably in the absence of reactive organic solvents which complicate recovery and purification of the glycerine product. The best results have been obtained by using the following proportions for the components of the reaction mixture:

Moles of allyl alcohol per mole of $H_2O_2$—1.2 to 8, preferably 1.5 to 4

Moles of water per mole of $H_2O_2$—30 to 200, preferably 60 to 100

Moles of tungstic catalyst per mole of $H_2O_2$—0.0001 to 0.05, preferably 0.0004 to 0.02

Lower proportions of olefinic compounds to hydrogen peroxide reduce the yield of hydroxylation products, while higher proportions reduce plant capacity without any compensating advantage. Amounts of water within the specified preferred range have the double advantage of accelerating the reaction as well as improving the yield. The speed of reaction is also promoted by increased catalyst concentration within the specified range. However, there are advantages in using amounts of catalyst in the lower portion of the specified range, preferably proportions of about 0.0001 to 0.0006, because with these small amounts it is economically feasible to dispense with catalyst recovery. Although the reaction time is thus increased compared with operations with 0.01 to 0.05 mole of tungstic catalyst which is the preferred range when using a catalyst recovery system, the process of the invention gives substantial reductions in reaction time with minimized losses of hydrogen peroxide when using these very low catalyst concentrations which cannot be obtained by prior methods of hydroxylation and may be the reason why no previous attempt has been made to use these small amounts of catalyst.

The tungstic catalysts used in the new process are, as previously indicated, the tungstic acids and their water-soluble salts. The tungstic acids include not only tungstic acid but also isopolytungstic acid and/or the heteropolytungstic acids of which phosphotungstic, molybdotungstic, bismotungstic and selenotungstic acids are representative examples. Instead of tungstic acid one can use tungstic oxides since it is converted to tungstic acid in the process. Suitable water-soluble salts of the tungstic acids include the alkali metal, alkaline earth metal and ammonium salts which may be the neutral salts or more preferably the acid salts such as sodium acid tungstate, calcium acid tungstate, sodium acid phosphotungstate and the like.

The process may be carried out in a number of different ways. Either batch, intermittent or continuous methods of operation can be employed, although for large scale manufacturing purposes continuous operation is generally preferable. The attached drawing illustrates an advantageous method of carrying out the process of the invention on a continuous basis when using tungstic acid as the catalyst and employing a catalyst recovery system which is not needed if lower concentrations of catalyst are employed as previously indicated.

As shown in the drawing, the allyl alcohol feed from a source not illustrated is fed by line 1 to a header 2 into which is also introduced, by line 3, recycled excess allyl alcohol recovered from the crude reaction product. Hydrogen peroxide, preferably in the form of an aqueous solution of about 30% to 35% concentration, is fed to the header 2 by line 4 in an amount corresponding to a mole ratio of allyl alcohol to hydrogen peroxide of 1.5:1 to about 4:1. Recovered catalyst supplied by line 6, together with a tungstic acid slurry introduced by line 7 in the required amount to make up for any catalyst lost in the process, are fed by line 5 to header 2. The recycled excess allyl alcohol can conveniently be an aqueous solution having a water content adjusted to provide, when account is taken of the water introduced with the hydrogen peroxide, the desired ratio of 30 to 200, preferably 60 to 100, moles of water per mole of hydrogen peroxide. The reaction mixture of allyl alcohol, hydrogen peroxide, water and tungstic hydroxylation catalyst is conducted by lines 8 and 9 from the header to circulating pump 10. The reaction mixture is pumped to a heat exchanger 11 in which it is brought into indirect heat exchange with a suitable medium, for example, warm or cold water introduced by line 12 and removed by line 13, so as to maintain the temperature of the reaction mixture in the first stage reactor 15 within the range of 40° C. to 60° C. The preferred temperature for the first stage of reaction of allyl alcohol is about 50° C. to 55° C. The temperature of the reaction mixture in the heat exchanger should not be greater than 60° C. and preferably should not differ from that of the mixture in reactor 15 by more than ±5° C. The mixture from heat exchanger 11 is conducted by line 14 to reactor 15 into which it is preferably introduced by a suitable mixing and agitating device. One such device is the injection jet 16 which may advantageously take the form of a vertical pipe provided with a plurality of outlet nozzles or other suitable openings so proportioned as to provide a sufficient velocity for the incoming stream of liquid to thoroughly mix the liquid in the reactor. This is facilitated in the modification shown in the drawing by withdrawal of reaction mixture by line 17 for recirculation through line 9, pump 10, heat transfer unit 11, line 14 and mixer 16. This recirculation of reaction mixture via the heat transfer unit gives the further advantage that only a small differential has to be applied to the circulating stream in order to maintain the mixture in reactor 15 at the desired uniform reaction temperature. Other mixing and temperature-regulating means may, however, be applied in the process of the invention.

The reaction mixture from unit 15 is withdrawn by line 18 from the upper part of the reactor and introduced near the bottom of reactor 19 in which further reaction of the hydrogen peroxide still present in a free form is carried out at the same, or other, temperature within the range of 40° C. to 60° C. Reactor 19 is provided with a bottom draw-off line 20 connected with a recirculation pump 21 which forces the circulated reaction mixture through heat exchanger 22 and line 25 back to reactor 19. The heat exchanger is provided with inlet and outlet lines 23 and 24 for circulation of a temperature control medium which may be heating or cooling water or the like as most suitable for maintaining the desired reaction temperature in reactor 19. A jet mixer 26 similar to that described in connection with reactor 15 insures thorough agitation and uniform mixing of the contents of the second stage reactor. The rate of withdrawal of reaction mixture via line 27 is equal to the rate of feed of reaction mixture in line 8 which is adjusted so as to provide a combined reaction time in reactors 15 and 19 such that the free hydrogen peroxide in the mixture is reduced to not more than 10% of its initial value. Most preferably, the reaction time within the range of 40° C. to 60° C., whether carried out in two stages as shown, or in a single stage, or three or more stages, is not substantially greater than that required for complete disappearance of free hydrogen peroxide from the reaction mixture, which period, however, is, as previously pointed out, not sufficient to complete the hydroxylation reaction.

Completion of the hydroxylation is carried out in reactor 28 which is fed with reaction mixture substantially free of uncombined hydrogen peroxide by line 27. Reactor 28 is equipped with a bottom draw-off line 29 which is connected by line 30 to a pump 31 for recirculating reaction mixture through heat exchanger 32 and line 33 to the mixing jet 34 of the reactor. Steam is an advantageous heating medium for use in the heat exchanger 32 which is provided with a steam inlet line 35 having a thermostatically controlled valve 36 for regulating the flow of steam in response to changes in the temperature of the reaction mixture in reactor 28. Condensed steam is removed by line 37. The temperature in the final stage of reaction carried out in reactor 28 is maintained higher than that in the preceding stage or stages of reaction and within the range of 70° C. to about 100° C. to complete the hydroxylation in minimum time without loss of reactants. For final reaction at temperatures above 100° C. at which superatmospheric pressures are necessary, a coil type reactor can be conveniently substituted for reactor 28 since quite short reaction times become practical at these temperatures. Thus under conditions at which 3 hours at 100° C. were required for the final stage of reaction, the residence time could be reduced to 13 minutes by using a temperature of 160° C. in the final reaction stage.

Reacted mixture is withdrawn by line 38 from the circulating stream and passed to centrifuge 39 for removal of the catalyst. The crude product stream from the centrifuge is taken off by line 40 to tank 41. The recovered tungstic acid catalyst is washed by water fed by line 42 to a slurry storage tank 43 from which it is removed by line 44 and returned by pump 45 to line 6 for reuse in the process. The crude product in tank 41 will contain, in addition to glycerine, water and excess unreacted alcohol which are separated by distillation in columns not shown and are used as the source of the aqueous recycle allyl alcohol stream supplied to line 3.

The following examples further illustrate the process of the invention and show some of the advantages which can be obtained.

Example I

In a plant of the type illustrated in the drawing, using as feed 2 moles of allyl alcohol per mole of hydrogen peroxide at an allyl alcohol concentration of 8.0% in the aqueous solution (72 moles of water per mole of hydrogen peroxide) and a weight ratio of tungstic acid catalyst to allyl alcohol in the feed of 0.06:1 (0.028 mole tungstic acid per mole hydrogen peroxide), with a one-hour residence time in each of the first two reactors, each maintained at 130° F. (54° C.), and one-hour residence time in the final reactor maintained at 160° F. (71° C.), the glycerine yield is 89 mole percent based on allyl alcohol and 87 mole percent based on the hydrogen peroxide fed.

Example II

Using a mixer and three stirred time tanks in series, allyl alcohol was hydroxylated employing a feed mixture containing water, allyl alcohol and hydrogen peroxide a mole ratio of 82:2:1. With 5.98% by weight of tungstic acid based on the allyl alcohol as catalyst and a temperature of 50° C. in the mixer and first two time tanks, and 70° C. in the last time tank, at a total residence time of 3 hours (2 hours at 50° C., at which time the hydrogen peroxide content of the mixture had been reduced to 5% but the glycerine produced was only 83 mole percent of the hydrogen peroxide, and 1 hour at 70° C.), a final conversion of hydrogen peroxide to glycerine of 88.4% was realized. The yield of glycerine based on allyl alcohol consumed was 89%. The glycerine was obtained as a 5.5% solution in water after removal of the excess allyl alcohol and analyzed 100% glycerine, although it had a detectable off-taste which was readily removed by treatment with activated charcoal to obtain a product meeting all tests for the purest glycerine.

Reaction in a single stage at 50° C. under otherwise similar conditions required 8 hours' residence time to obtain an equal conversion of hydrogen peroxide to glycerine. At higher temperatures in such single stage reaction, there is a definite loss in yield which increases as the reaction temperature is increased, for example, at 70° C. the ultimate yield is 85.6%.

Example III

This example illustrates the process of the invention as applied with small amounts of tungstic catalyst such that catalyst recovery is not necessary for economical operation.

The tests were made using reactors illustrated in the drawing for the first stage of reaction which was carried out at 50° C. Stirring of the reactors was accomplished by external circulation of the reactor contents at about one gallon per minute. The composition of the feed was as follows: 1.5 moles of allyl alcohol and 33.5 moles of water per mole of hydrogen peroxide, and 0.017 to 0.02% by weight of tungstic acid based on the total weight of solution together with sodium hydroxide to bring the pH to about 5.

In a first run using two of the reactors in series for the reaction at 50° C., 77 hours' reaction time was required for substantially complete reaction (99.6% reaction) of the hydrogen peroxide. The reaction mixture was then heated in a continuous coil reactor at 160° C. for 10 minutes and a yield of glycerine of 82.7% based on hydrogen peroxide applied and 86% based on allyl alcohol consumed was obtained.

A companion run under the same conditions except employing only one reaction stage was carried out at 50° C. with a reaction time of 105 hours, after which analysis showed the same conversion, 99.6%, of hydrogen peroxide but a yield of only 55.5% glycerine based on hydrogen peroxide applied.

Example IV

The desirability of using mole ratios of water to hydrogen peroxide greater than 30:1 in the process of the invention is illustrated by the following results obtained in tests made with three reactors in series as shown in the drawing. The tests were made with a feed containing allyl alcohol and hydrogen peroxide in mole ratios of 1.9–2.1:1 and 0.5% tungstic acid catalyst based on the total weight of the feed. The first two reaction stages were operated at 40°–55° C. with equal residence times totalling 2 to 3 hours which resulted in reaction of 95–98% of the hydrogen peroxide. The yields obtained with increased dilution were as follows:

| Moles of $H_2O$ per Mole of $H_2O_2$ in the Feed | Yield of Glycerine (mole percent) | |
|---|---|---|
| | Based on $H_2O_2$ Applied | Based on Allyl Alcohol Reacted |
| 17.2 | 69.1 | 70.3 |
| 26.4 | 70.9 | 74.9 |
| 31 | 75.9 | |
| 44.6 | 78.4 | 82.3 |
| 59 | 81.5 | |
| 70 | 82.7 | 88.4 |
| 72 | 83.8 | 90.4 |
| 76 | 84.4 | 88.8 |

The yield is similarly improved when using sodium acid tungstate or berylotungstic acid ($BeO \cdot 12_2O_3 \cdot 32H_2O$) as the catalyst.

It will thus be seen that the new process offers many advantages, particularly in increasing plant throughput and yield of glycerine based on hydrogen peroxide. It is capable of considerable variation not only in respect to the tungstic catalysts which may be used, but also in regard to the procedure employed in carrying out the different stages of the process. It will therefore be understood that the invention is not limited to the details which have been described in illustrating the principles involved nor by any theory proposed in explanation of the improved results which are obtained.

I claim as my invention:

1. A process of producing glycerine which comprises reacting allyl alcohol with hydrogen peroxide in the presence of a catalyst of the group consisting of tungstic acid ($H_2WO_4$) and water-soluble salts thereof using a feed containing an excess of allyl alcohol to peroxide, water and said catalyst and maintaining the reaction mixture within the range of 40° to 60° C. until at least 95% of the hydrogen peroxide has reacted, then heating the reaction mixture at a temperature substantially higher than 60° C. and recovering the glycerine produced.

2. A process in accordance with claim 1 wherein the final heating of the reaction mixture is carried out at a temperature substantially above 100° C.

3. A process of producing glycerine which comprises reacting allyl alcohol and hydrogen peroxide in the presence of a catalyst of the group consisting of tungstic acid ($H_2WO_4$) and water-soluble salts thereof using a mole ratio of allyl alcohol to hydrogen peroxide of 1.2:1 to 4:1 and 30 to 100 moles of water per mole of hydrogen peroxide in the feed and maintaining the reaction mixture at a temperature within the range of 40° C. to 60° C. for a period sufficient for essentially complete disappearance of free hydrogen peroxide from the reaction mixture, then heating the reaction mixture at a temperature between 100° and 200° C. and recovering the glycerine produced.

4. A process in accordance with claim 3 wherein $H_2WO_4$ is used as catalyst.

5. A process of producing glycerine which comprises reacting a molar excess of allyl alcohol with aqueous hydrogen peroxide in an aqueous medium containing 30 to 100 moles of water and 0.0001 to 0.0008 mole of catalyst of the group consisting of tungstic acid ($H_2WO_4$) and water-soluble salts thereof per mole of hydrogen peroxide at a temperature within the range of 40° C. and 60° C. until the hydrogen peroxide has substantially completely reacted, then heating the reaction mixture at a temperature of at least 70° C. before recovering the glycerine therefrom.

6. A process in accordance with claim 5 wherein tungstic acid salt is used as the catalyst.

References Cited in the file of this patent

UNITED STATES PATENTS

| | | |
|---|---|---|
| 2,373,942 | Bergsteinsson | Apr. 17, 1945 |
| 2,510,905 | Raczynski | June 6, 1950 |
| 2,613,223 | Young | Oct. 7, 1952 |
| 2,754,325 | Smith | July 10, 1956 |

OTHER REFERENCES

Mugdan et al.: Chem. Soc. J. (London), pp. 2991, 2998-9 (1949).